United States Patent [19]

Mirchandani

[11] Patent Number: 5,671,078

[45] Date of Patent: Sep. 23, 1997

[54] ACCURATE LASER POWER CONTROL FOR DUAL/MULTIPLE BEAMS

[75] Inventor: Vinod Mirchandani, Agoura, Calif.

[73] Assignee: Xerox Corporation, Stamford, Conn.

[21] Appl. No.: 673,883

[22] Filed: Jul. 1, 1996

[51] Int. Cl.$^6$ ................................................ G02B 26/08
[52] U.S. Cl. ............................ 359/204; 359/900; 347/246
[58] Field of Search ........................... 359/204, 212–219, 359/900; 347/225, 236, 246; 358/296, 300; 372/24, 29, 31; 355/210, 228, 229, 233

[56] References Cited

U.S. PATENT DOCUMENTS

4,899,348  2/1990  Kiya et al. .................................. 372/38
5,436,645  7/1995  Uemura et al. ............................. 372/31

*Primary Examiner*—James Phan
*Attorney, Agent, or Firm*—Fariba Rad

[57] ABSTRACT

There is disclosed a method of reducing banding problem in multi-diode raster scanning systems. In this invention a test mode is provided for measuring and adjusting the output power of the laser diodes. During the test mode an individual patch is used for the light beam of each diode to individually measure and adjust the output power of each laser diode. By individually adjusting the output power of each laser diode to a required level, the banding problem is substantially reduced.

1 Claim, 11 Drawing Sheets

ACCURATE LASER POWER CONTROL FOR DUAL/MULTIPLE BEAMS

BACKGROUND OF THE INVENTION

This invention relates to laser diode controller and more particularly to a dual laser diode controller which is capable of controlling the power of each laser diode individually.

Typically, a single beam laser diode assembly has a single diode and usually, in a scanning system, the diode is connected to a train of image pixel information. The pixel information is used to drive the diode and therefore stimulate laser flux emission where there is a pixel. Ideally, in order to keep the light beam generated by the laser diode constant, the temperature of the diode should be kept at a constant level. However, due to the structure of the laser diode assembly, over time, the temperature of the diode increases which in turn causes the output power of the laser diode to decrease. Since a certain level of output power is required to discharge the pixels on a photoreceptor, the decrease in the output power will cause a decrease in the amount of discharge on the photoreceptor. This in turn will cause a decrease in the amount of toner attraction on the photoreceptor which will cause the shade of the ink of a printed document to deviate (lighter or darker) form an intended shade.

In order to eliminate the deviation of the shade of the ink, it is necessary to keep the output level of a laser diode at a certain level.

In dual laser diode light sources, there are two laser diodes each of which emits a single light beam and each light beam is modulated individually with a different train of pixel information. Dual laser diodes are usually used in raster scanning systems to scan two lines simultaneously in an interlace format. Due to the tolerances of laser diodes, each laser diode reacts differently to the temperature. As a result, each laser diode exposes the photoreceptor differently. This causes a phenomenon known as banding. Banding happens when the shade of the ink on all the lines that are scanned by one of the light beams is different than the shade of the ink on all the lines scanned by the other light beam.

Since the banding problem is created as a result of difference between the output power of the two diodes, it is necessary to adjust the output power of each laser diode individually.

It is an object of this invention to adjust the output power of each laser diode individually in order to sufficiently reduce the banding problem.

SUMMARY OF INVENTION

There is disclosed a method of individually adjusting each laser diode of a multidiode raster scanning system in order to substantially reduce a phenomenon known as banding. In this invention, in a raster scanning system which uses interlace format, against the common approach of keeping both light beams on, the light beams will be turned on alternatively during a test mode. During the test mode, one diode will be turned on and its output power will be adjusted to a required output power and then the next diode will be mined on for output power adjustment. Individually adjusting the output power of each laser diode substantially reduces the banding problem.

DETAILED DESCRIPTION OF THE INVENTION

Figure 1:
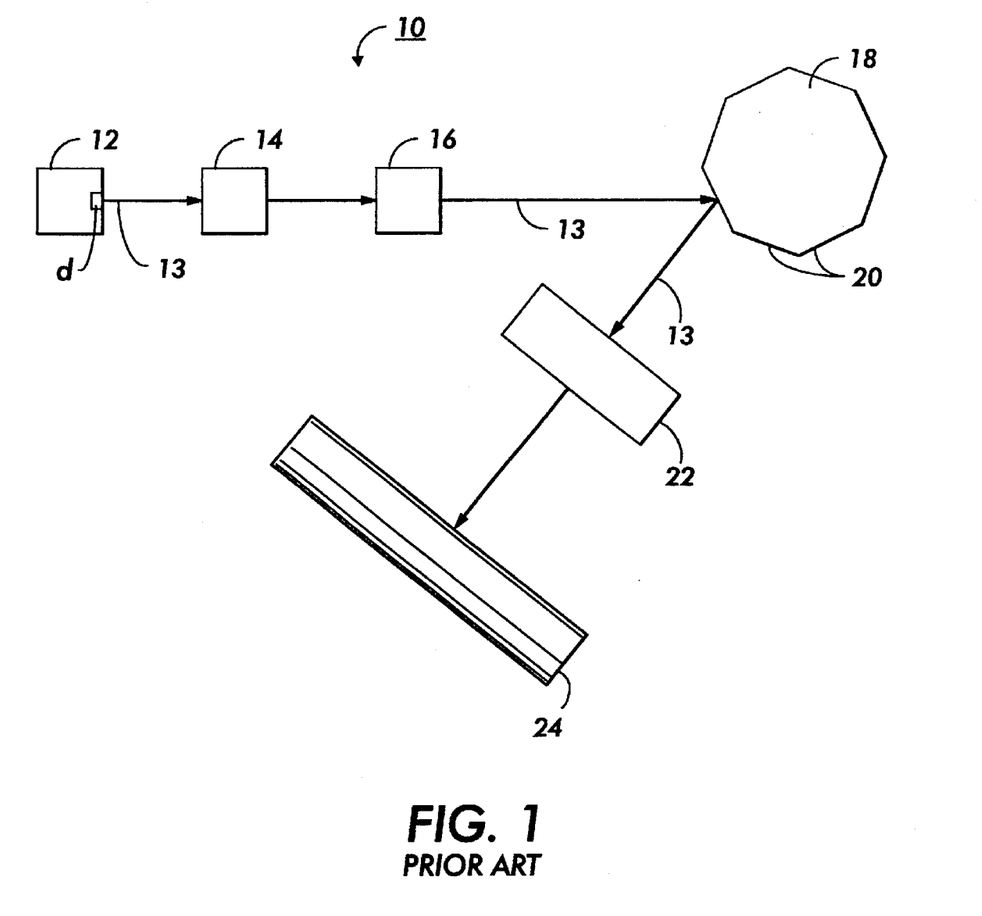
FIG. 1 shows a tangential (fast-scan) view of a prior art single light beam raster scanning system.
Figure 2:
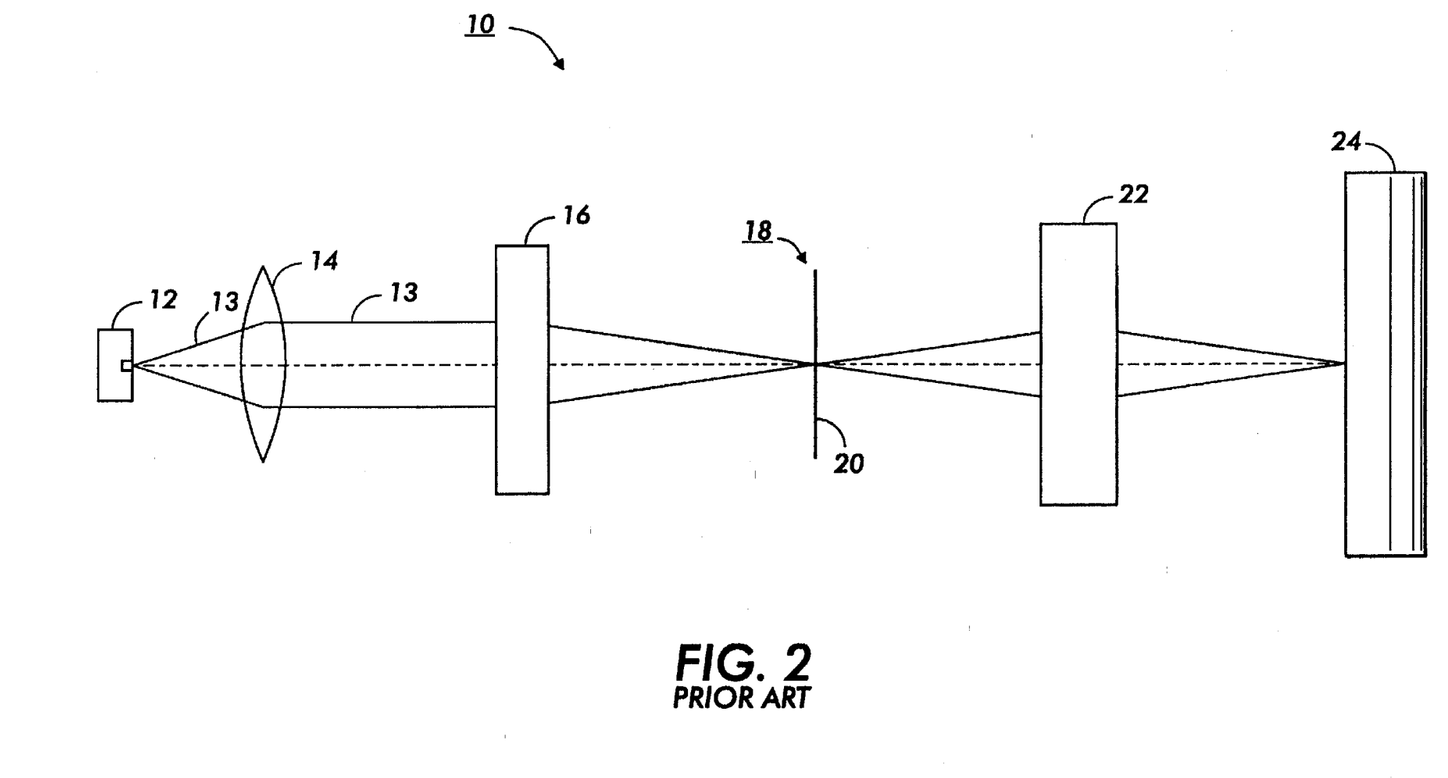
FIG. 2 shows a sagittal (cross-scan) view of raster scanning system of FIG. 1.

Referring to FIG. 1, there is shown a tangential (fast-scan) view of a single light beam raster scanning system 10. Referring to FIG. 2, there is shown a sagittal (cross-scan) view of raster scanning system 10 of FIG. 1. Referring to Both FIGS. 1 and 2, the laser light source 12 emits a light beam 13 and sends the light beam 13 to the rotating polygon mirror 18 through the collimator 14 and the pre-polygon optics 16. The collimator 14 collimates the light beam 13 and the pre-polygon optics 16 focuses the light beam 13 in the sagittal or cross-scan plane onto the rotating polygon mirror 18.

The facets 20 of the rotating polygon mirror 18 reflect the light beam 13 and also cause the reflected light beam 13 to revolve about an axis near the reflection point of the facet 20. The reflected light beam 13 can be utilized through the post polygon optics 22 to scan a document at the input end of an imaging system as a raster input scanner or can be used to impinge upon a photographic film or a photosensitive medium 24, such as a xerographic drum (photoreceptor), at the output of the imaging system.

In order to measure the output power of the laser diode d of the light source 12, the first approach is to use the backfacet diode which is a diode which is typically built into the package of the laser diode light sources.

Figure 3:
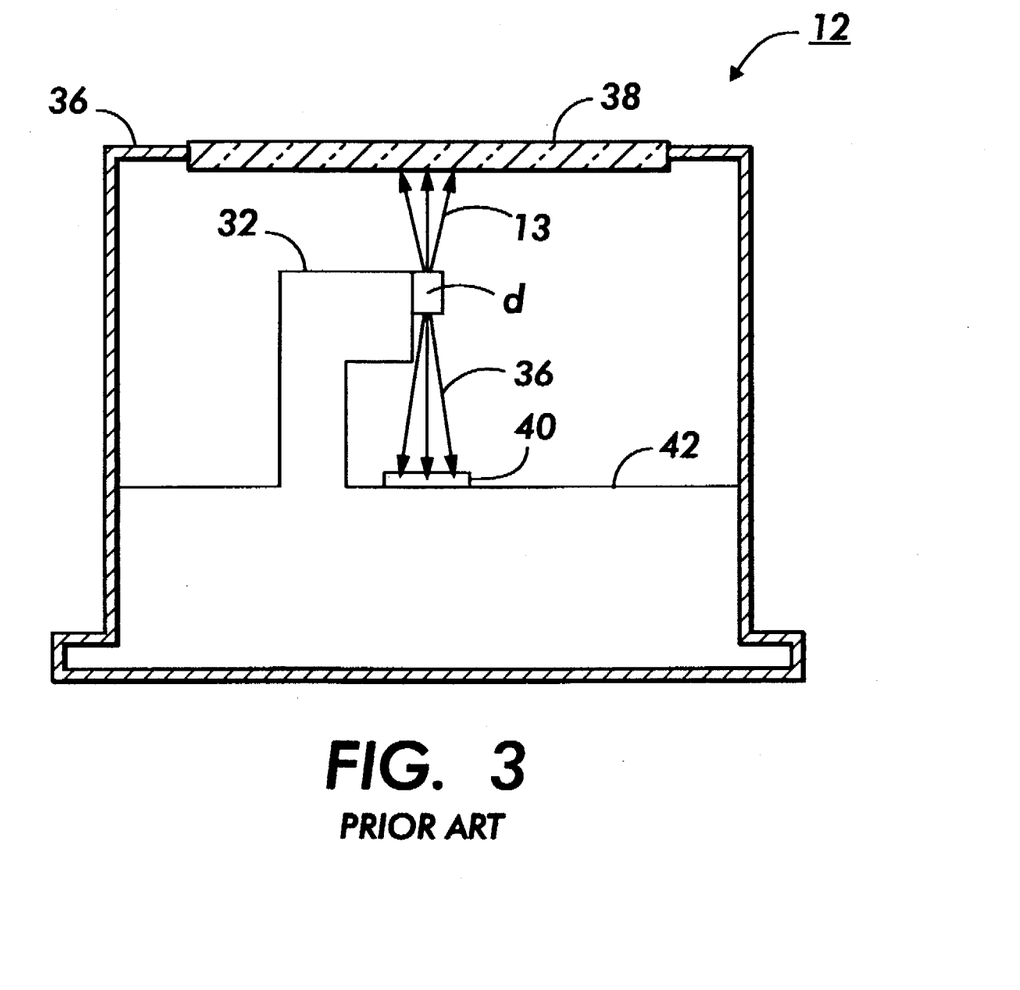
FIG. 3 shows a structure of a prior art laser light source of FIGS. 1 and 2.

Referring to FIG. 3, there is shown a structure 30 of a prior art laser light source 12 of FIGS. 1 and 2. A laser diode d is secured on a flange 32 in a housing 34. The laser diode d emits light in two opposite directions 13 and 36. The intensity of the light beam 36 is a fraction of the intensity of the light beam 13. The housing 34 contains a window 38 which allows the light beam 13 to be emitted outside of the housing. A backfacet diode 40, which is also called back photodiode, is located on the path of the light beam 36 and is secured on a plate 42. When the light beam 36 shines on the backfacet diode 40, the backfacet diode 40 generates a current. Based on the ratio between the intensity of the light beams 36 and 13, the current generated by the backfacet diode 40 will be used to determine the optical output power of the diode d.

Figure 4:
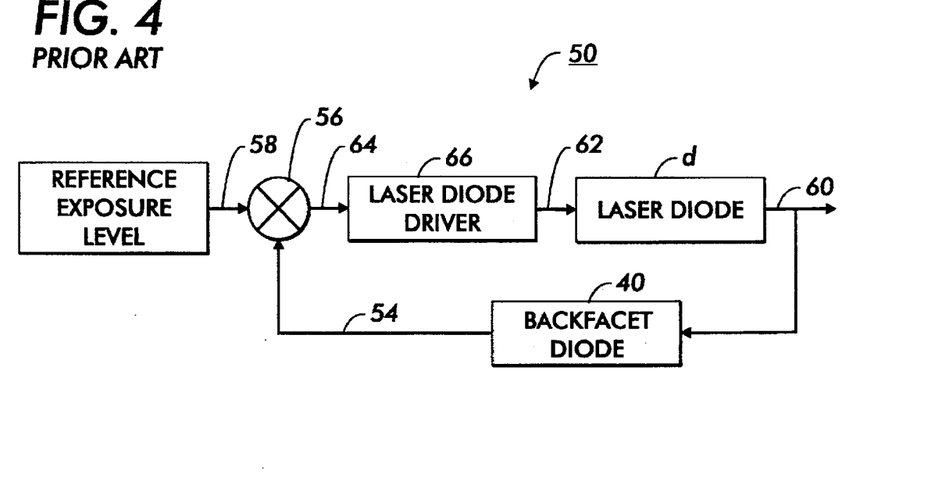
FIG. 4 shows a block diagram of the internal circuit of the laser diode of FIG. 3 and its backfacet diode.

Referring to FIG. 4, there is shown a block diagram 50 of the internal circuit of the laser diode d of FIG. 3 and its backfacet diode 40. The current 54, generated by the backfacet 40, will be sent to a comparator 56 to be compared to a reference exposure level 58. If the comparison happens to be zero, the laser diode's output power 60 is at the reference exposure level 58 and there is no need to change the driving current 62 of the laser diode. Therefore, the comparator 56 will send out a signal 64 to the laser diode driver 66 to keep the laser diode driving current 62 constant.

If the comparison of the signal 54 and the reference exposure level 58 shows a difference, then the driving current 62 of the laser diode d has to be modified in order to adjust the output power 60 of the laser diode d to the reference exposure level 58. However, the backfacet diode 40 is very sensitive to temperature and as a result, it does not provide an accurate result which in mm may not accurately adjust the output power 60 of the laser diode d.

Figure 5:
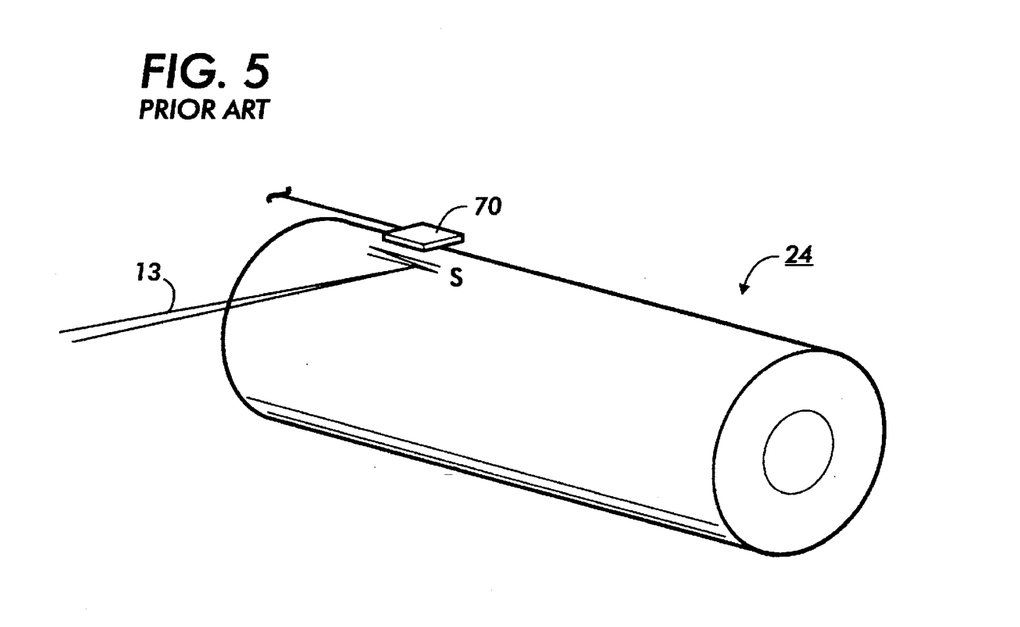
FIG. 5 shows an Electro Static Voltmeter (ESV) being placed above the photoreceptor of FIGS. 1 and 2.

Therefore, to accurately adjust the output power of a laser diode, an Electro Static Voltmeter (ESV) is used. Referring to FIG. 5, an ESV 70 will be placed above the photoreceptor 24 of FIGS. 1 and 2. After the light beam 13 scans a patch S, the photoreceptor rotates until the patch S moves under the ESV 70. At this time, the ESV 70 measures the amount of discharge on the photoreceptor.

It should be noted a patch is an area on the photoreceptor which is scanned by a light beam and therefore the photoreceptor in this area is discharged. The ESV measures the amount of charge left on the photoreceptor after being scanned by a light beam.

Figure 6:
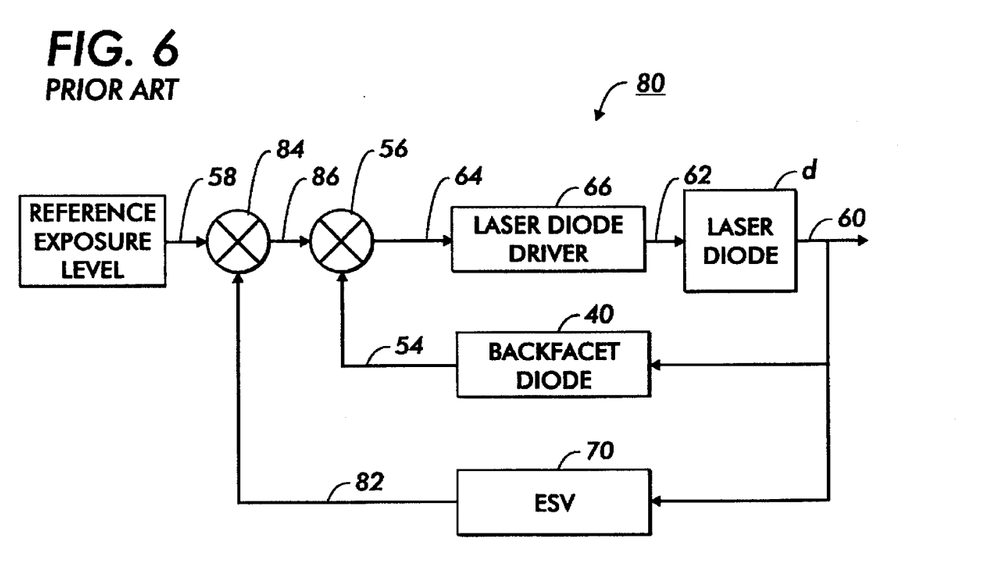
FIG. 6 shows a block diagram of a circuit which shows the connection of the ESV of FIG. 5 to the block diagram of FIG. 4.

Referring to FIG. 6, there is shown a block diagram 80 of a circuit which shows the connection of the ESV 70 of FIG. 5 to the block diagram 50 of FIG. 4. The measured value 82 by the ESV 70 will be sent to a comparator 84. The comparator 84 compares the measured value 82 to the reference exposure level 58. If there is a difference between the amount of discharge voltage 82 and the reference exposure level 58, then a feedback signal 86 will be sent to a comparator 54. The feedback signal 86 will be used as guideline for the backfacet diode 40. Comparator 54 will compare the current 54 from the backfacet diode 40 to the feedback signal 86 and sends the result as a signal 64 to the laser diode driver 66 to modify the driving current 62 of the laser diode d.

If the measured value 82 is equal to the reference exposure level (the laser diode's output power is at the reference exposure level), then the feedback signal 86 and the current 54 from the backfacet diode 40 will be zero and therefore, there is no need to change the driving current 62 of the laser diode d. As a result, the comparator 56 will send a signal 64 to the laser diode driver 66 to keep the laser diode driving current 62 constant.

Since the backfacet diode 40 is not accurate, it might not accurately adjust the output power 60 of the laser diode d. However, in this case, if the output power of the laser diode d does not reach the exposure level 58, the measured signal 82 from the ESV 70 will be different than the reference exposure level 58 and therefore, the comparator 84 will keep sending a non zero feedback signal 86. As long as the feedback signal 86 is not zero, the comparator 56 will compare the signal 54 from the backfacet diode 40 to the feedback signal 86 and send out a signal 64 to the laser diode driver 66 to modify the laser diode driving current 62 to adjust the output power 66 of the laser diode d.

Once, the output power 60 of the laser diode d reaches the reference exposure level 58, the comparator 84 and the backfacet diode 40 will send out zero signals 86 and 54 respectively and the comparator 56 sends out a signal 64 to the laser diode driver 66 to keep the laser diode driving current 62 constant.

This method of adjusting the output power is utilized in single beam raster scanning systems. However, if a raster scanning system utilizes a dual beam light source, a problem known as banding which does not exists in a single beam raster scanning system will be introduced.

Figure 7:
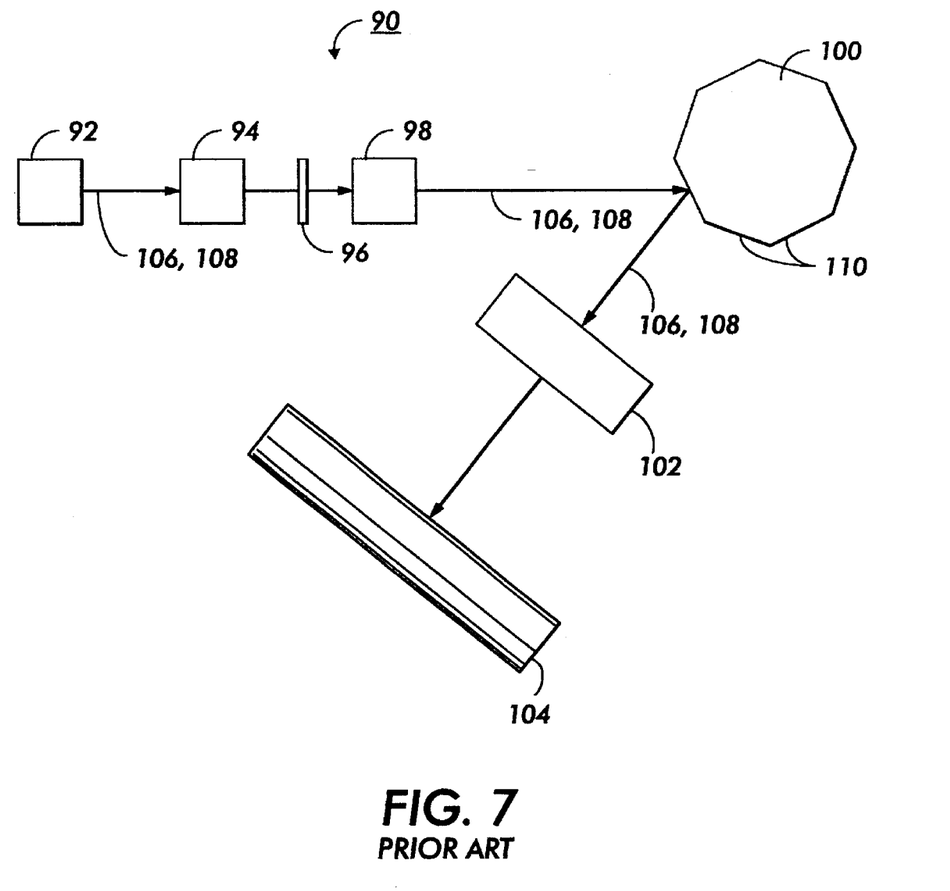
FIG. 7 shows a tangential (fast-scan) view of a conventional dual-beam raster scanning system.
Figure 8:
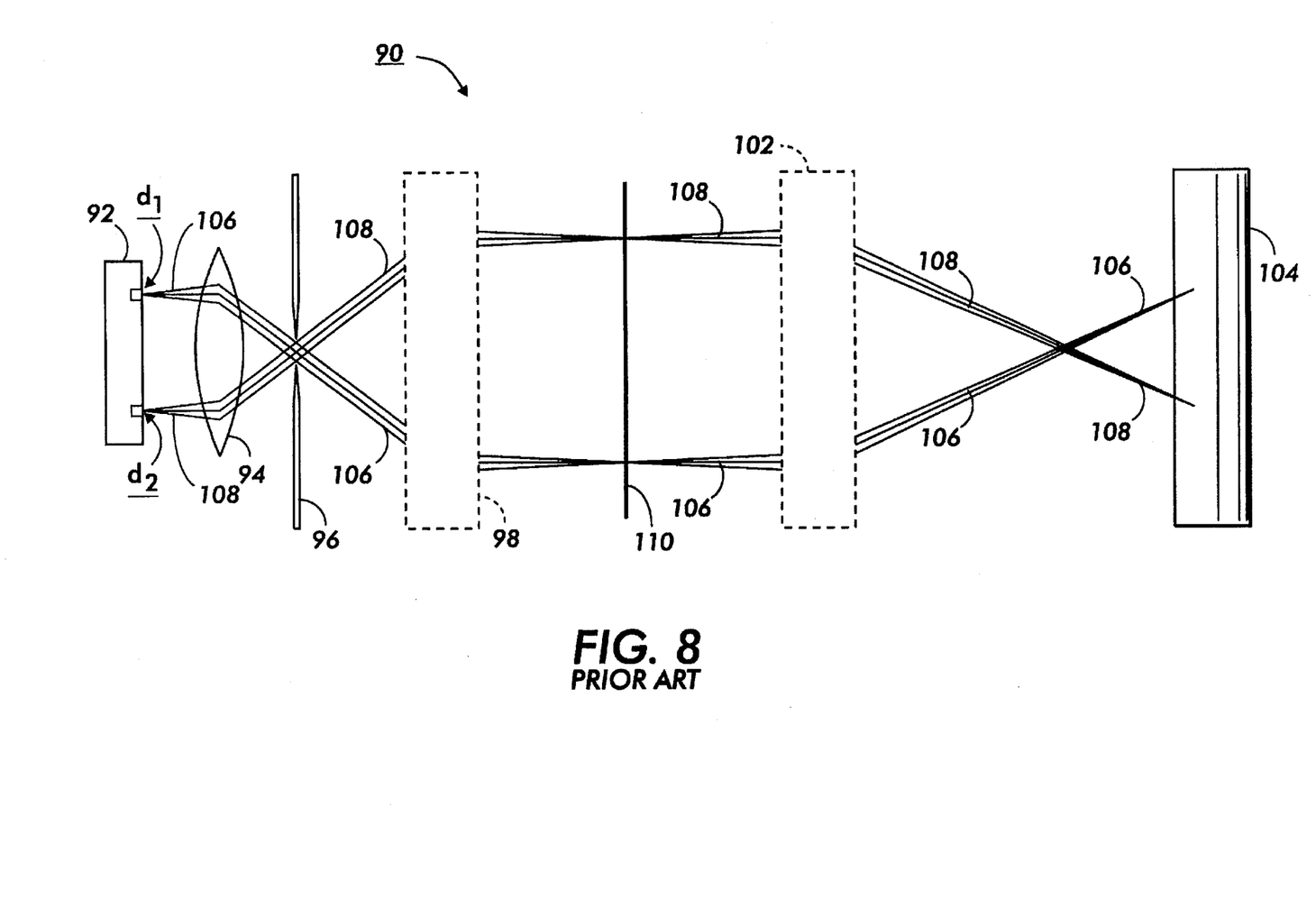
FIG. 8 shows a sagittal (cross-scan) view of the raster scanning system of FIG. 7.

Referring to FIG. 7, there is shown a tangential (fast-scan) view of a conventional dual-beam raster scanning system 90 and referring to FIG. 8, there is shown a sagittal (cross-scan) view of the raster scanning system 90 of FIG. 7. Referring to both FIGS. 7 and 8, raster scanning system 90 utilizes a dual laser light source 92, a collimator 94, an aperture 96, pre-polygon optics 98, a multi-faceted rotating polygon mirror 100 as the scanning element, post polygon optics 102 and a photosensitive medium 104.

In FIG. 8, as can be observed, the laser light source 92 has two laser diodes $d_1$ and $d_2$. Laser diode $d_1$ emits a light beam 106 and laser diode $d_2$ emits a light beam 108. In FIG. 7, the two light beams 106 and 108 overlap each other.

It should be noted that in FIG. 7, for the purpose of simplicity, only the center ray of light beams 106 and 108 are shown to illustrate the path of the light beams. Furthermore, as can be observed in FIG. 7, the rotating polygon mirror has a plurality of facets 110, each of which is a plane mirror. However in FIG. 8, for the purpose of simplicity, one of the facets 110 which is receiving the light beams, at a given time, is shown as line 110 and the light beams from the facet 110 are unfolded.

Referring to both FIGS. 7 and 8, the laser light source 92 sends the light beams 106 and 108 to the rotating polygon mirror 100 through the collimator 94, the aperture 96 and the pre-polygon optics 98. The collimator 94 collimates the light beams 106 and 108, the aperture 96 clips the two light beams as needed and the pre-polygon optics 98 focuses the light beams 106 and 108 in the sagittal or cross-scan plane onto the rotating polygon mirror 100.

The facets 110 of the rotating polygon mirror 100 reflect the light beams 106 and 108 and also cause the reflected light beams 106 and 108 to revolve about an axis near the reflection point of the facet 110. The reflected light beams 106 and 108 can be utilized through the post polygon optics 102 to scan a document at the input end of an imaging system as a raster input scanner or can be used to impinge upon a photographic film or a photosensitive medium 104, such as a xerographic drum (photoreceptor), at the output of the imaging system.

Figure 9:
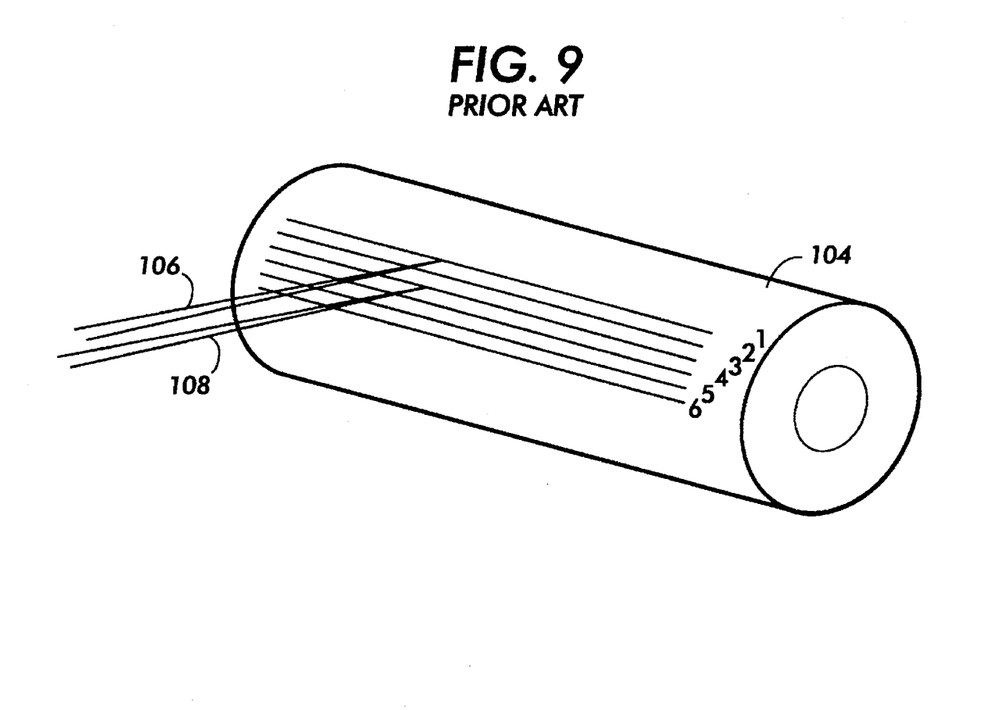
FIG. 9 shows how two light beams are used in an interlace format.

The rotating polygon mirror 100 scans both light beams 106 and 108 across the photoreceptor 104 simultaneously. Once the light beams 106 and 108 start scanning, they scan the photoreceptor simultaneously with each light beam scanning an individual line. For example, referring to FIG. 9, light beam 106 scans line 1 while light beam 108 scans line 3. On the next scan, the light beam 106 will scan line 2 and the light beam 108 will scan line 4. The following lines will be scanned in the same manner. This format of scanning lines, which is a well known format, is called "interlace".

Once the two light beams are used in an interlace format, if the output power of one light beam slightly differs from the other light beam, a phenomenon known as banding will appear on the printed document. In banding, the scan lines which are scanned by one light beam will be either darker or lighter than the scan lines which are scanned by the other light beam.

In a single light beam raster scanning system, if the output power of the laser diode is slightly different than the reference exposure level, the effect on the printed document is not visible since the amount of ink used throughout the document is uniform.

In order to reduce the banding problem, the output power of the laser diodes have to be adjusted to the reference exposure level.

Figure 10:
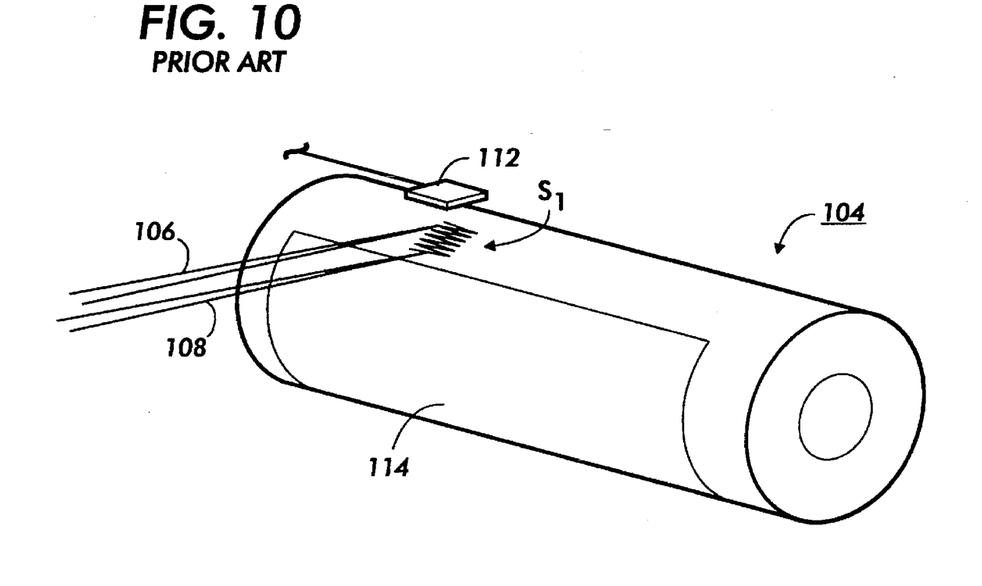
FIG. 10 shows an ESV placed over the photoreceptor of FIGS. 7 and 8.

Referring to FIG. 10, an ESV 112 was placed over the photoreceptor 104 of FIGS. 7 and 8. In FIG. 10, region 114 is the latent image and the time during which the latent image is being scanned is called latent image generation. The output power of the laser diodes $d_1$ and $d_2$ had to be adjusted prior to the latent image generation.

Therefore, in the raster scanning system 90, two modes, a test mode and a latent image generation mode, was created. During the test mode, the output power of the diodes are measured and adjusted and during the latent image generation, each one of the diodes will be modulated by a different train of pixel information in order to scan the latent image.

In a raster scanning system which uses an interlace format in which two light beams are always kept on, the obvious and common approach to adjust the output power of the diodes $d_1$ and $d_2$ was to keep both light beams on (during the test mode) and scan a patch in an interlace format and use the ESV to measure the output power of the diodes $d_1$ and $d_2$ through the discharged patch on the photoreceptor. During the test mode, the light beams 106 and 108 would scan a certain patch $S_1$ prior to the region 114. As the photoreceptor 104 rotated, the patch $S_1$ would move under ESV 112. Then, the ESV 112 would measure the output power of the laser diodes $d_1$ and $d_2$ through the patch $S_1$. The measured value from the ESV 112 would be used as a signal similar to the signal 82 of FIG. 6 to modify the laser diode driving current 62 and to adjust the output powers of both diodes $d_1$ and $d_2$.

However, this approach did not produce a sufficient reduction in banding since the measured value was an average value of the output power of the diodes $d_1$ and $d_2$. The ESV 112 measured the discharged value of the patch $S_1$ which was scanned by both light beams from the diodes $d_1$ and $d_2$. As a result, the output powers of $d_1$ and $d_2$ were adjusted based on an average value and therefore did not sufficient reduce the banding problem. Therefore, a different approach was needed.

Figure 11:
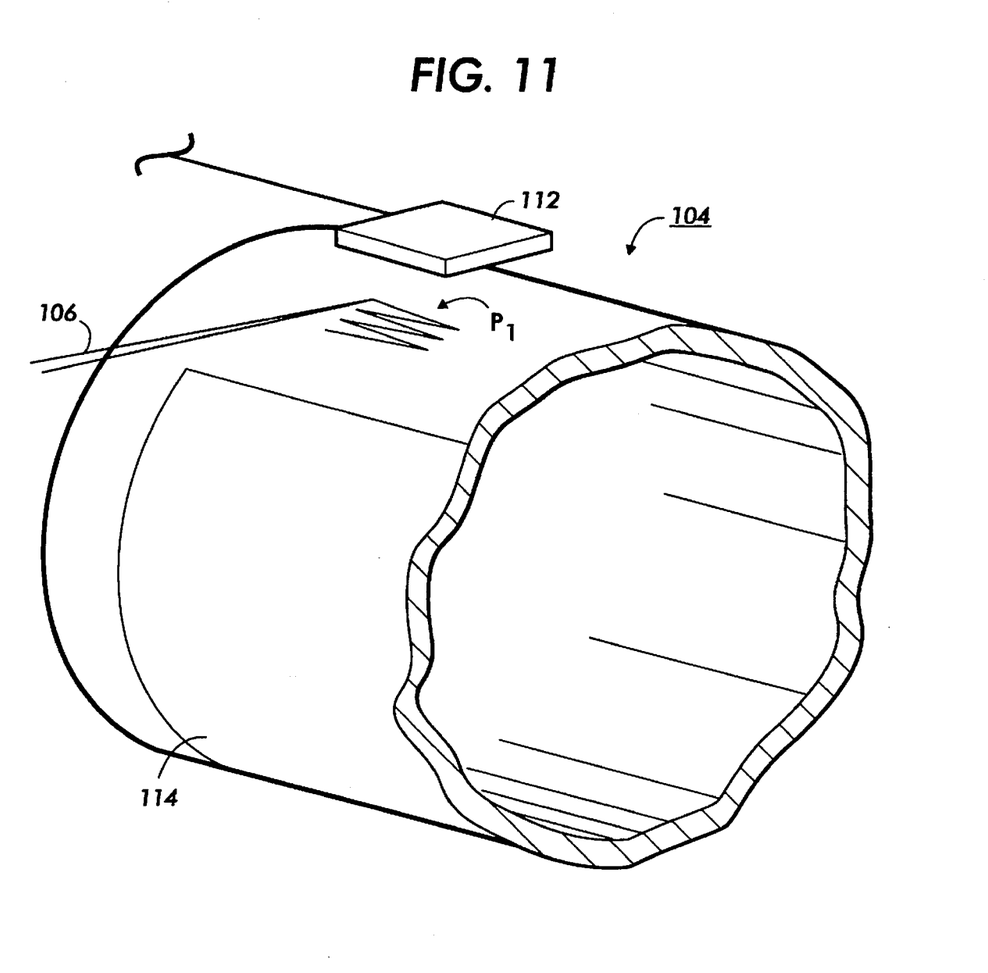
FIG. 11 shows a patch used to measure the output power of the diode d1.
Figure 12:
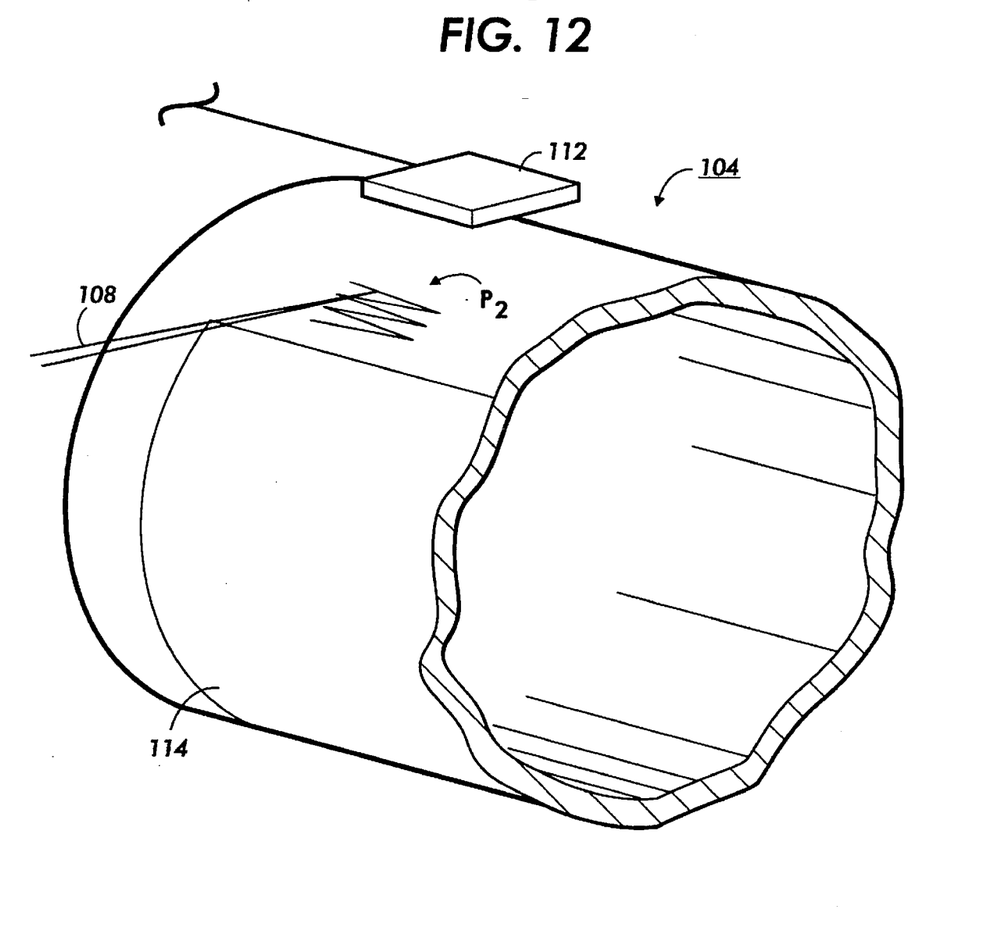
FIG. 12 shows a patch used to measure the output power of the diode d2.

Referring to FIGS. 11 and 12, there is shown a method suggested by this invention which is capable of measuring the output power of each laser diode individually. In this invention, against the common approach, during the test mode, the diodes will be turned on alternatively.

Referring to both FIGS. 8 and 11, in this method, during the test mode, the laser diode $d_1$ will be turned On and the laser diode $d_2$ will be turned Off. The light beam 106 from the laser diode $d_1$ will be used to scan patch $P_1$. Then, after the photoreceptor 104 rotates, the patch $P_1$ will move under the ESV 112 and the ESV 112 will measure the discharge value of the patch $P_1$. Since the patch $P_1$ is scanned by the one light beam 106 from the diode $d_1$, the ESV 112 measures only the output power of the laser diode $d_1$.

Figure 13:
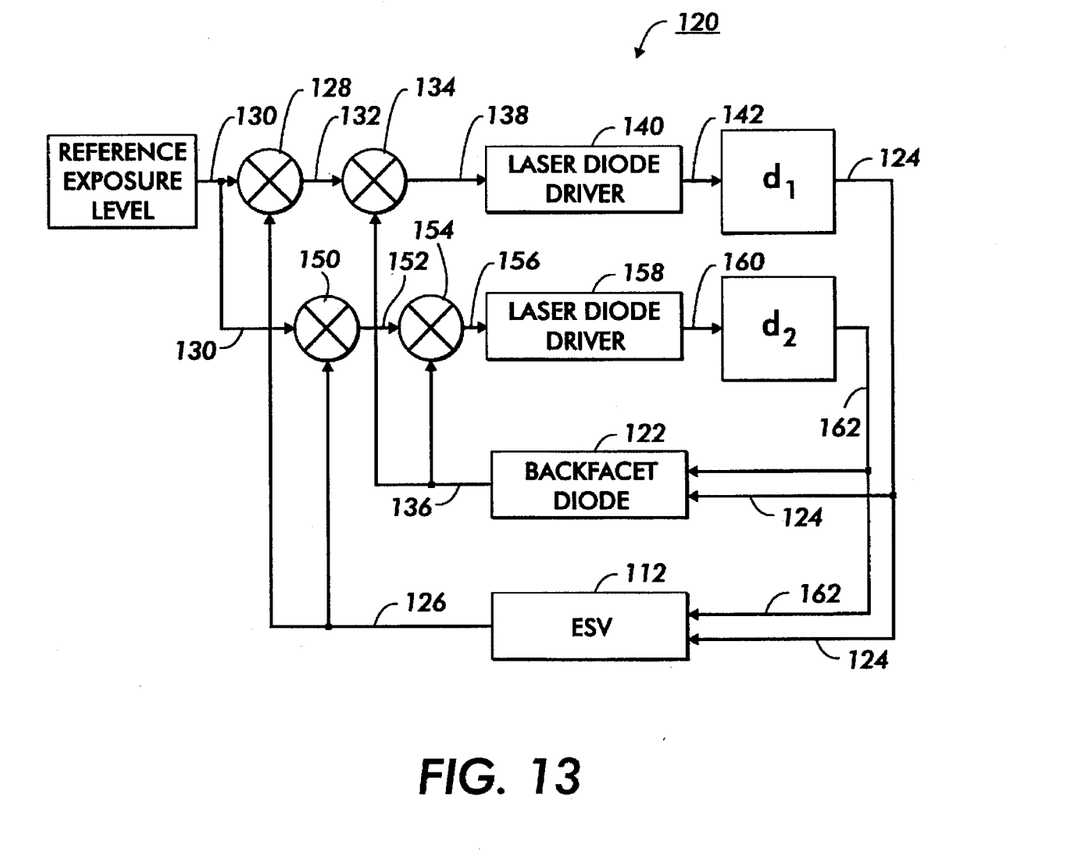
FIG. 13 shows a block diagram which connects the ESV of FIGS. 11 and 12 to the backfacet diode and the diodes $d_1$ and $d_2$.

Referring to FIG. 13, there is shown a block diagram 120 of the circuit which connects the ESV 112 to the backfacet diode 122 and the diodes $d_1$ and $d_2$. As shown in FIG. 13, typically in a multi-diode laser light source, there is only one backfacet diode. From the patch $P_1$, ESV 112 measures the output power 124 of the diode $d_1$ and sends the measured signal 126 to the comparator 128. The comparator 128 compares the reference exposure level 130 to the measured signal 126 and sends a feedback signal 132 to the comparator 134 which also receives a signal 136 from the backfacet diode 122. The comparator 134 compares the signal 136 and the feedback signal 132 and sends out a signal 138 to the laser diode driver 140 which generates the laser driving current 142 of the diode $d_1$. The signal 138 causes the laser driving current 142 to be modified in order to adjust the output power 124 of the diode $d_1$.

Once the output power of the laser diode $d_1$ is adjusted to the desired level, then the laser diode $d_1$ will be mined off and the laser diode $d_2$ will be turned on. Referring to FIGS. 8 and 12, at this time the light beam 108 generated by the laser diode $d_2$ will start scanning patch $P_2$. The laser diode $d_2$ scans patch $P_2$ due to the movement of the photoreceptor 104. By the time the laser diode $d_2$ is turned on, the patch $P_1$ has moved away from the scanning light beam 108 and as a restfit, the light beam 108 starts scanning the patch $P_2$.

Once the patch $P_2$ moves under the ESV 112, the ESV measures only the output power of the laser diode $d_2$ since the patch $P_2$ is scanned by the light beam 108 from the diode $d_2$.

Referring to FIG. 13, the restfit from the measurement of the ESV 112 will be sent to the comparator 150. The comparator 150 compares the reference exposure level 130 to the measured signal 126 and sends a feedback signal 152 to the comparator 154 which also receives a signal 136 from the backfacet diode 122. The comparator 154 compares the signal 136 and the feedback signal 152 and sends out a signal 156 to the laser diode driver 158 which generates the laser driving current 160 of the diode $d_2$. The signal 156 causes the laser driving current 160 to be modified in order to adjust the output power 162 of the diode $d_2$.

This method of adjusting the output powers of the laser diodes substantially reduces the difference between the output powers and therefore substantially reduces the banding problem.

The testing mode is done prior to the image generation mode. However, one can selectively switch between the latent image generation mode and the laser diode test mode. This means that one can select to switch to the test mode after scanning each latent image or can select to switch to the laser diode test mode after scanning certain number of latent images.

The suggested solution of this invention provides a more precise feedback to each laser diode and therefore, the output powers of each laser diode will be adjusted individually as required for each laser diode. Therefore, by adjusting the output powers of the laser diodes individually, the banding problem will be substantially reduced.

It should be noted that the method suggested in this invention can also be applied for the laser light source with more than two diodes.

It should also be noted that numerous changes in details of construction and the combination and arrangement of elements and materials may be resorted to without departing from the true spirit and scope of the invention as hereinafter claimed.

I claim:

1. A method of individually measuring the output power of each laser diode of a multi-diode laser light source in a scanning system having a laser diode output power test mode and a latent image generation mode, the method comprising the steps of:

a. switching to a laser diode output power test mode b. turning off all the laser diodes except one laser diode;

c. scanning the light beam from the one laser diode onto a photoreceptor in an area prior to an area used for a latent image;

d. measuring a discharged value of the photoreceptor from the scan lines scanned by the scanning light beam;

e. comparing the measured discharged value to a reference exposure level;

f. adjusting the output power of the one laser diode according to the result of the comparison;

g. turning off the one laser diode;

h. selecting a laser diode which its output has not been adjusted;

i. turning the selected laser diode on;

j. repeating steps c through i until there is no diode which its output has not been adjusted;

k. turning on all the laser diodes and switching to a latent image generation mode where the laser diodes are responsive to image data to form a latent image on the latent image area of the photoreceptor; and m. selectively switching between the laser diode output power test mode and the latent image generation mode.

* * * * *